June 4, 1963  O. J. B. ORWIN  3,092,038
CONVEYOR SYSTEMS
Filed June 14, 1961  8 Sheets-Sheet 1
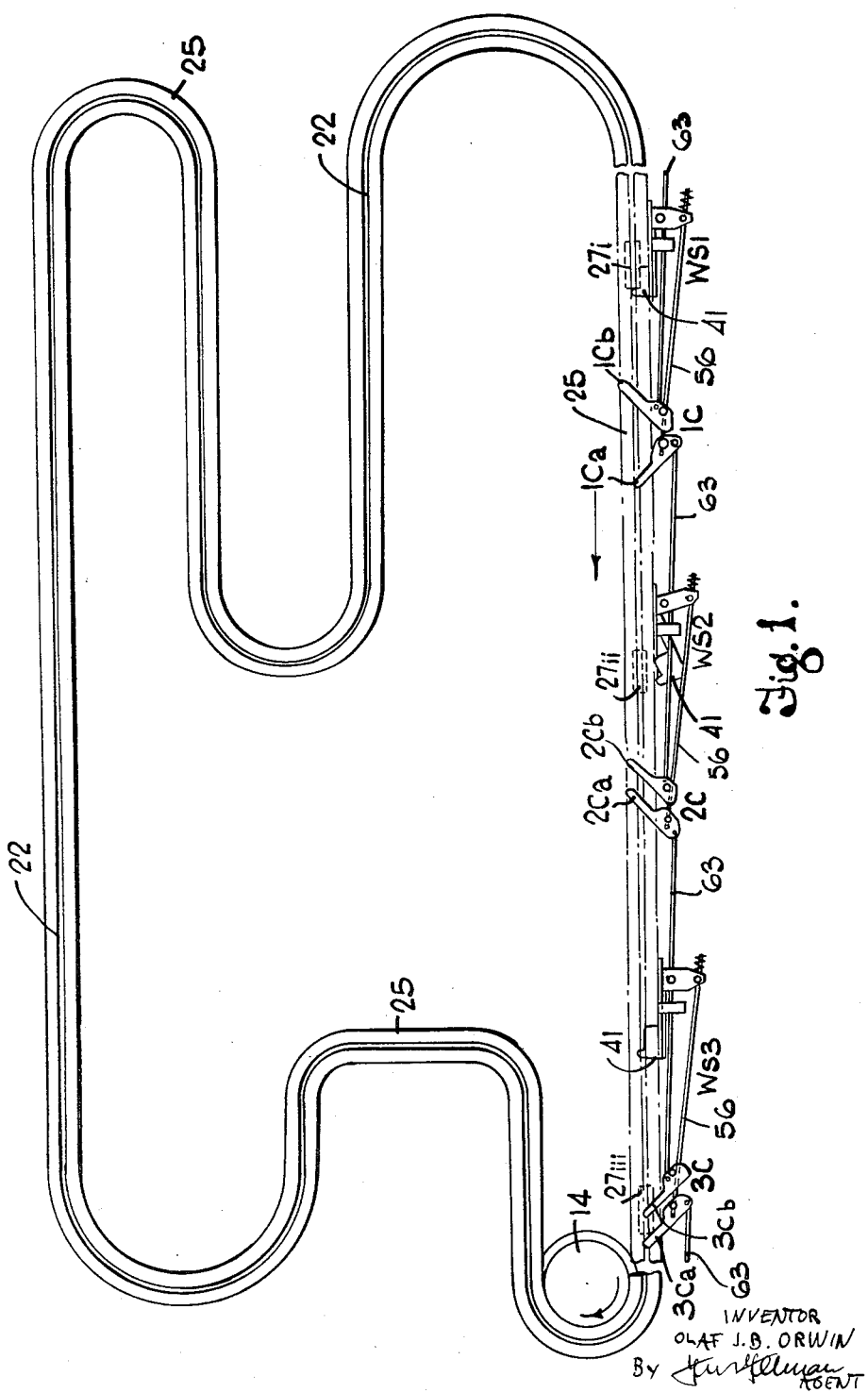

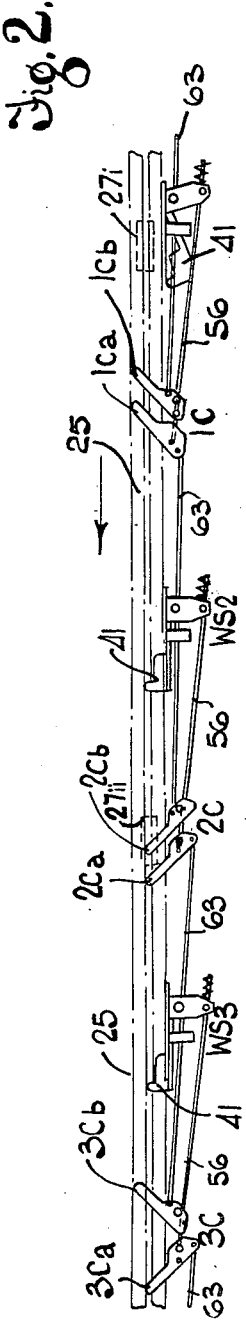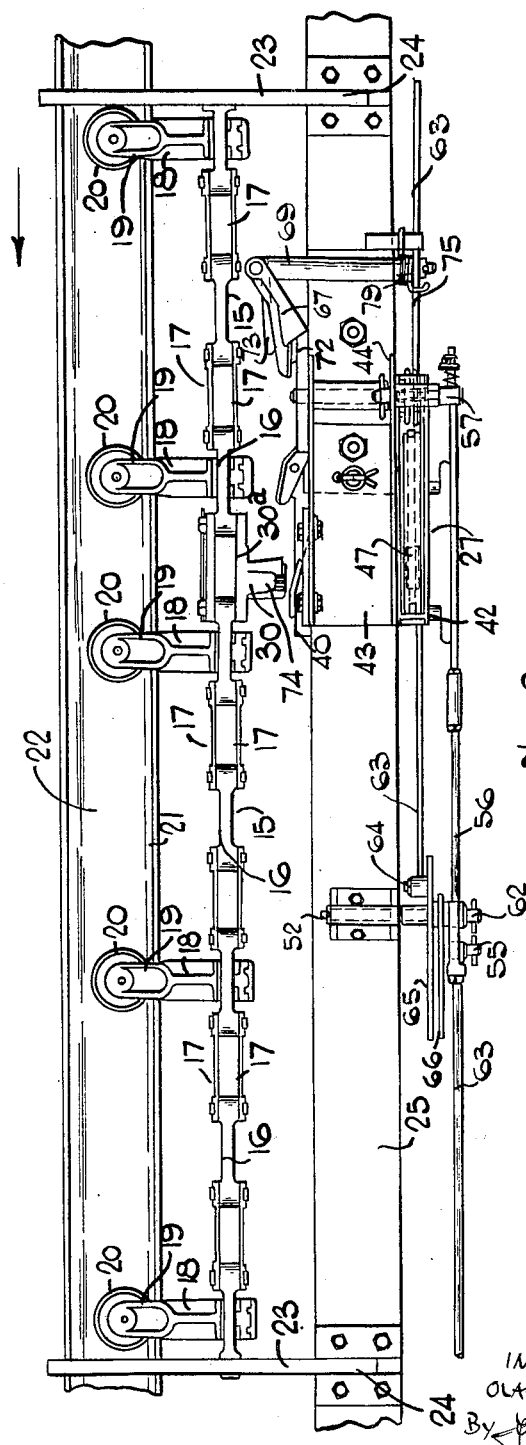

June 4, 1963  O. J. B. ORWIN  3,092,038
CONVEYOR SYSTEMS

Filed June 14, 1961  8 Sheets-Sheet 3

INVENTOR
OLAF J.B. ORWIN
BY [signature]
AGENT

INVENTOR
OLAF J.B. ORWIN

June 4, 1963

O. J. B. ORWIN 3,092,038

CONVEYOR SYSTEMS

Filed June 14, 1961

INVENTOR
OLAF J.B. ORWIN
By [signature]
AGENT

INVENTOR
OLAF J. B. ORWIN
BY
AGENT

# 3,092,038
CONVEYOR SYSTEMS

Olaf J. B. Orwin, Quinton, Birmingham, England, assignor to Fisher & Ludlow Limited, Tipton, England, a British company
Filed June 14, 1961, Ser. No. 117,161
Claims priority, application Great Britain June 15, 1960
14 Claims. (Cl. 104—172)

This invention relates to conveyor systems of the kind comprising an endless conveying element adapted to advance a plurality of article carriers along an associated track, which track embodies a plurality of work stations spaced at intervals along the length of the track and means for temporarily bringing a carrier to rest at each work station during the continued advancement of the conveyor element.

One known form of conveyor system of the foregoing kind embodies a single work station provided with a plurality of carrier drive disengaging elements spaced along the length of the track at such work station so as to arrest at such particular work station a number of article carriers one behind the other, the arrangement being such that when the foremost arrested carrier leaves the work station, each of the following arrested carriers successively move up one position at the work station concerned.

Such known form of conveyor system of the foregoing kind has been developed primarily for the purpose of arresting a number of successive carriers at one given work station, and the present invention has for its object the provision of a further form of conveyor system of the foregoing kind in which the arresting and subsequent advancement of a carrier at one given work station is respectively controlled by, and itself controls respectively, the movement of a carrier past some other work station spaced from said given work station and at some other position along the length of the carrier track.

According to the present invention there is provided a conveyor system of the kind specified which is characterised by the provision of a plurality of work stations spaced apart along the length of the carrier track, carrier arresting means at each of said work stations displaceable between carrier arresting and carrier advancing positions, a carrier operated control means located in advance of each of said work stations and adapted to be actuated by the passage of a carrier along the track, each of said control means comprising a carrier arresting control member and a carrier release control member operatively connected respectively to the carrier arresting means of the next in-rear and next but one in rear work station, the arrangement being such that advance of a carrier to a predetermined position or positions beyond a given work station operates one of said carrier arresting control members to effect displacement of the associated arresting means at said work station from a carrier advancing to a carrier arresting position to preclude the advancement of a further carrier beyond said given work station, and in respect of the work station next in-rear of said given work station, operates one of said carrier release control members to effect displacement of the associated carrier arresting means of said next in-rear work station to displace the carrier arresting means thereof from the carrier arresting to the carrier advancing position so as thereby to permit of the advance of a further carrier from said next in-rear work station to the given work station referred to.

In such an arrangement it will be appreciated that in respect of any two successive work stations and contrary to the known arrangement above referred to, on the advancement of a carrier beyond the foremost of said two work stations (in the direction of carrier advancement), a carrier arrested at the rearmost station remains at such station with its advancement arrested until the carrier advancing beyond the foremost station has advanced clear of such station to operate the control member associated with the rearmost station and released the arrested carrier, advancement of which beyond the foremost of the two stations is prevented by the above described displacement of the arresting means of the foremost station into the arresting position until subsequently released.

Such release may be effected by the advancement of the first of the two carriers referred to, to a third work station situated in advance of the two successive work stations above described, or it may be effected by manual operation in the case, for instance, of the carrier advancing beyond the first of a number of successive work stations.

The location along the carrier track of the two control members for operating the arresting means of the station in-rear and of the station next in-rear may be the same for both control members.

Alternatively, the control member associated with the station next in-rear may, in the direction of carrier advancement, be situated rearwardly of the control member for operating the arresting means of the station next but one in-rear, the arrangement being such as to ensure displacement of the arresting means of the station next in-rear into the arresting position before the arresting means of the station next but one in-rear has been moved into the release position to permit of advancement of the there arrested associated, i.e. next following carrier.

The control members may operate their associated arresting means electrically, pneumatically or mechanically, and where mechanical operation is adapted, it is convenient for both control members to be located at the same common position along the length of the track, for example, by constructing each control member as a lever, the two levers being mounted upon a common pivot.

Preferably the control member which is adapted to displace into arresting position the arresting means of the station next in-rear is connected to the control member next in advance, i.e. in advance of the next in advance work station, such next in advance control member serving to displace into release position the arresting means of the said station next in-rear when the carrier is advanced to a predetermined position beyond the said work station next in advance.

Where, as is preferred, the conveying element is provided with a series of driving dogs, the final freeing of an arrested carrier would preferably be effected under the over-riding control of a driving dog advancing to the work station in question, such an arrangement ensuring that a released carrier does not advance except under the control of an associated driving dog of the conveying element.

The control means may be connected to each associated arresting means and to the control means next in advance through pull rods or cables in the case where the control means is adapted to operate mechanically, and the pull rods where provided being of straight configuration where the track is straight. Where the track is of non-straight configuration the pull rods may be replaced by an articulated linkage arrangement.

Where a control member in the form of a pivotally mounted lever is provided, this, in the case where it is adapted to displace into arresting position the arresting means of the next in-rear work station, may be retained mechanically in such position by an over dead centre arrangement.

Where, as is preferred, the conveying element is provided with a series of driving dogs for driving the article carriers, the arrangement may be such that the drive to each carrier is disconnected at the appropriate work station without displacing the driving dog or the adjacent part of the conveying element in a direction transversely of the length of the conveying element, for example, in accordance with the invention the subject of my patent application No. 117,160 of even date.

Alternatively, the conveying element may be provided with driving dogs which are pivotally displaceable or vertically slidably displaceable in relation to the conveying element.

The invention is illustrated in the accompanying drawings wherein:

FIGURE 1 is a diagrammatic plan view of one form of conveyor system in accordance with the present invention, the system being depicted with certain parts thereof at one stage in a sequence of operations.

FIGURE 2 is a view of part of the construction depicted in FIGURE 1 but showing the position of the parts referred to at a further stage in the sequence of operations.

Figure 4:
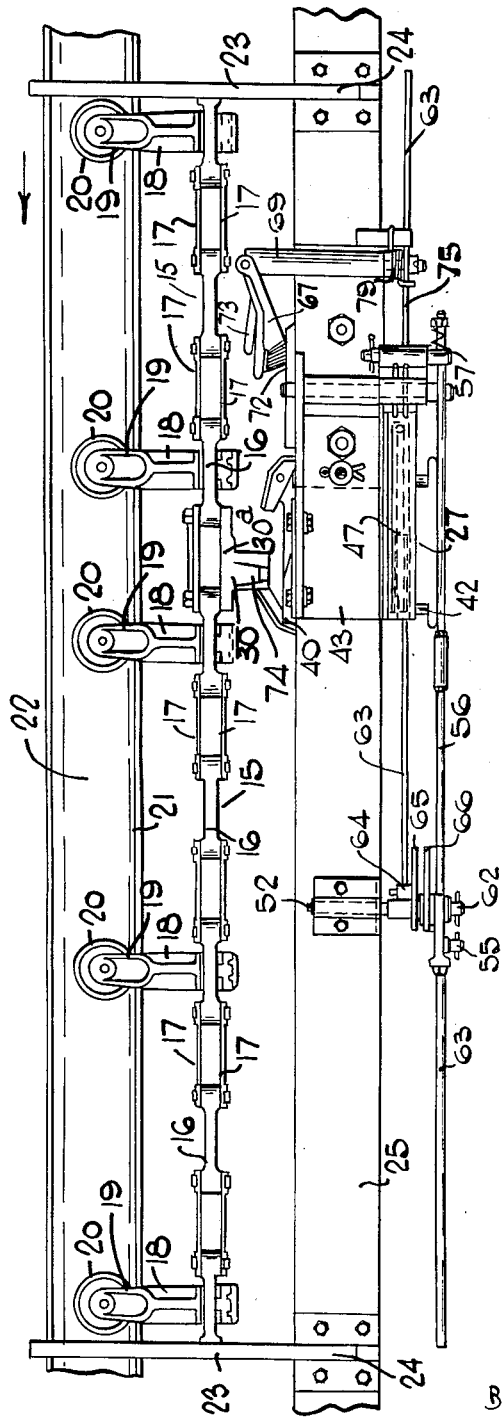
Figure 5:
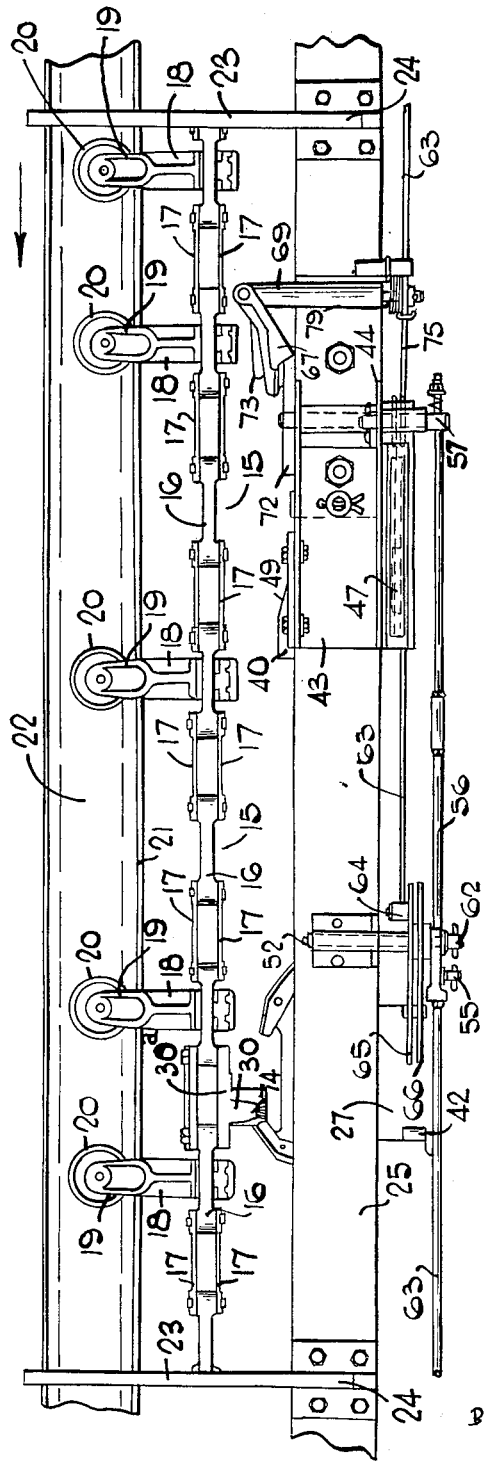

FIGURES 3, 4, and 5 are side elevations to an enlarged scale of part of the construction depicted in FIGURE 1 and showing respectively each of the three stages which form the complete sequence of operations of the system.

Figure 6:
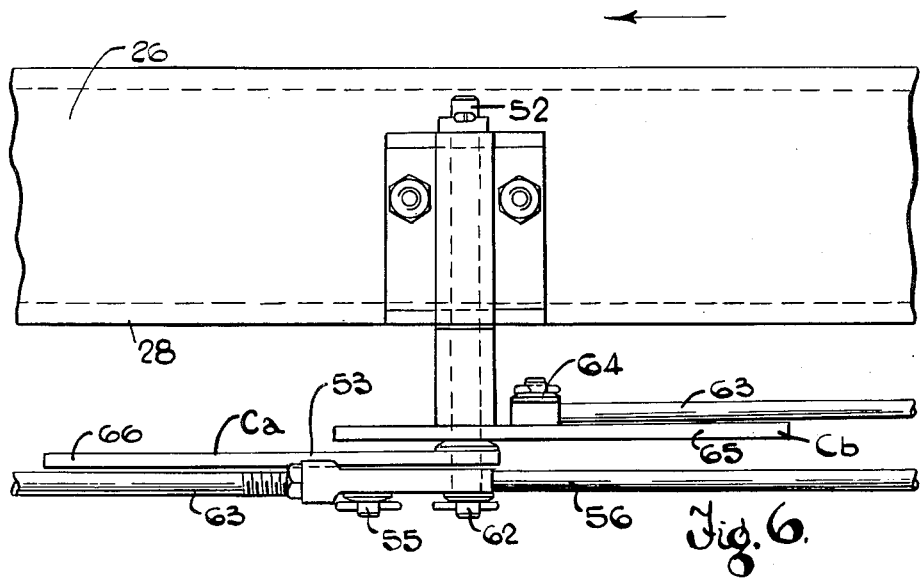

FIGURE 6 is a side elevation to an enlarged scale of one of the control means showing a carrier arresting control member and a carrier release control member of the construction depicted in FIGURES 3 to 5.

Figure 7:
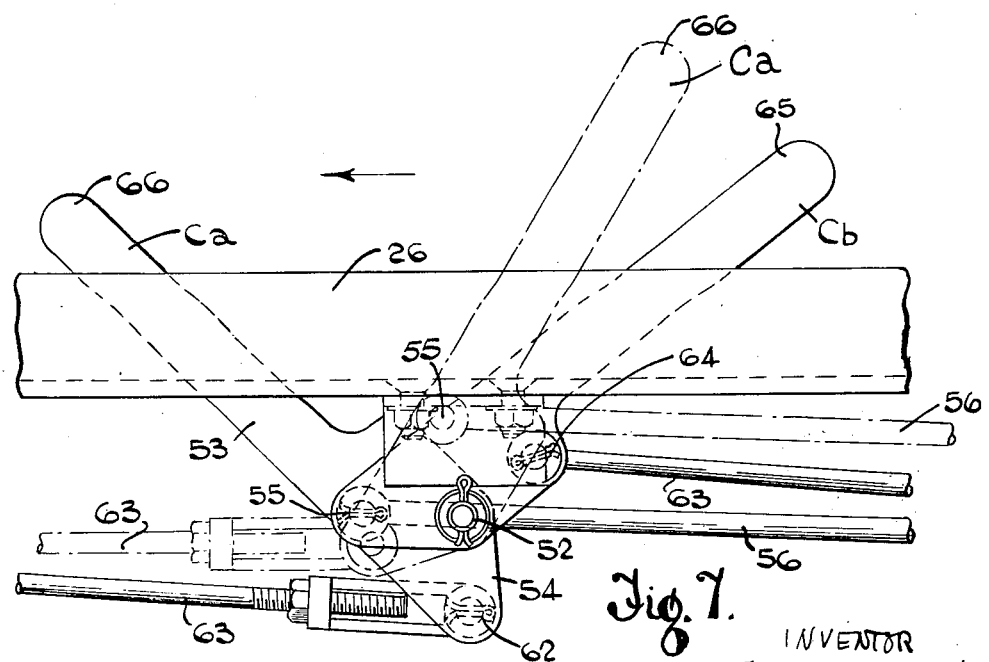

FIGURE 7 is a plan view of the arrangement depicted in FIGURE 6.

Figure 8:
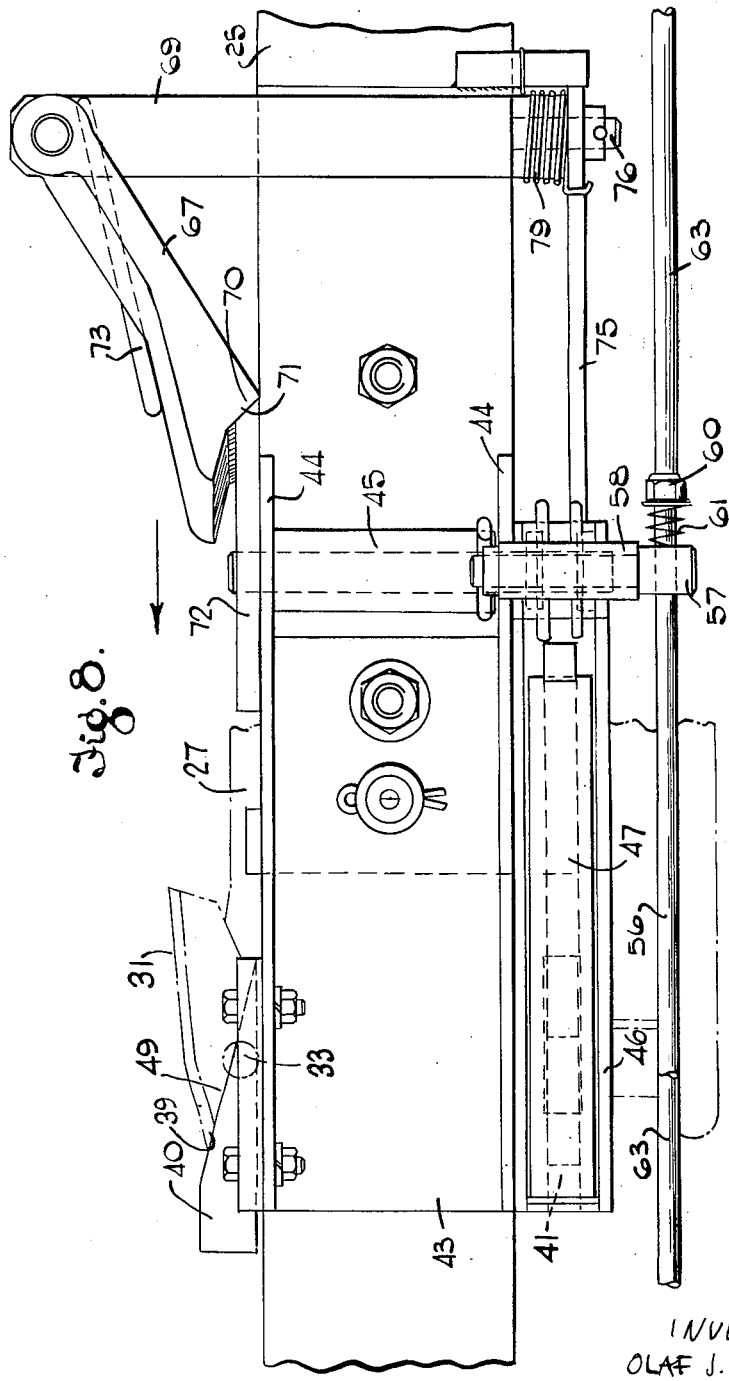

FIGURE 8 is a side elevation to an enlarged scale of one of the work stations which are depicted also in FIGURES 3, 4, and 5.

Figure 9:
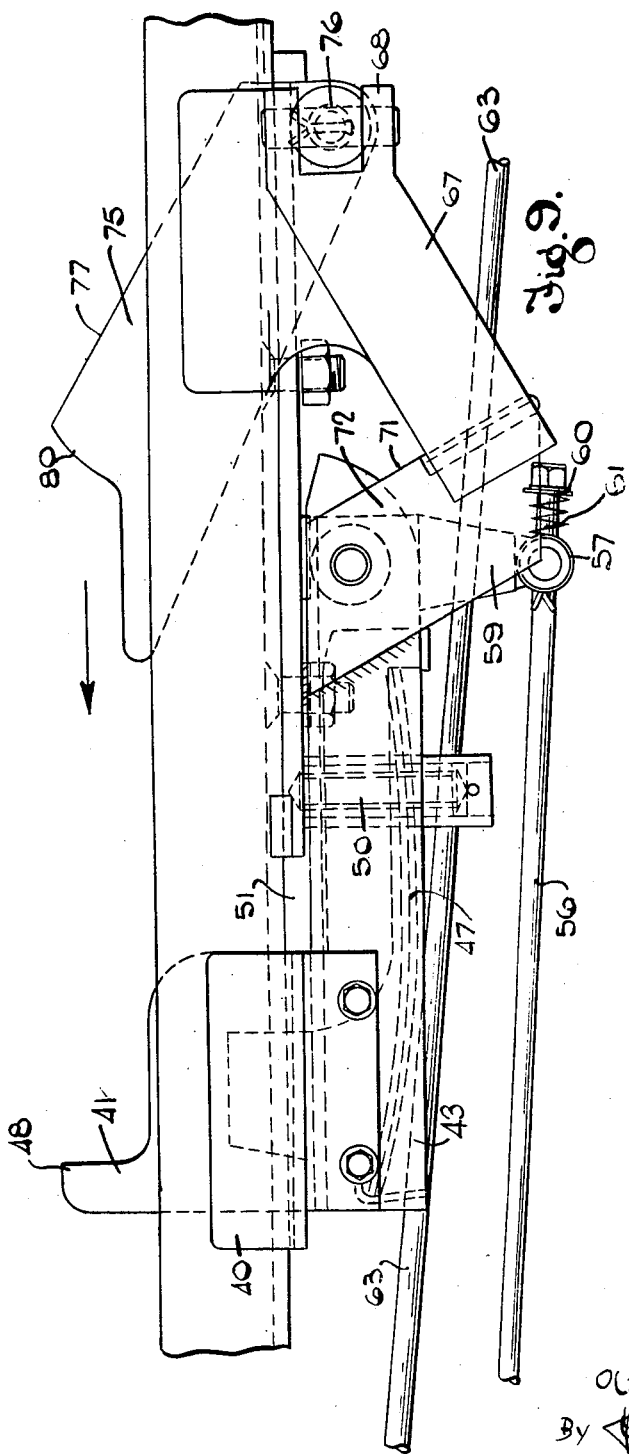

FIGURE 9 is a plan view of the part of the conveyor system which is depicted in FIGURE 8.

Figure 10:
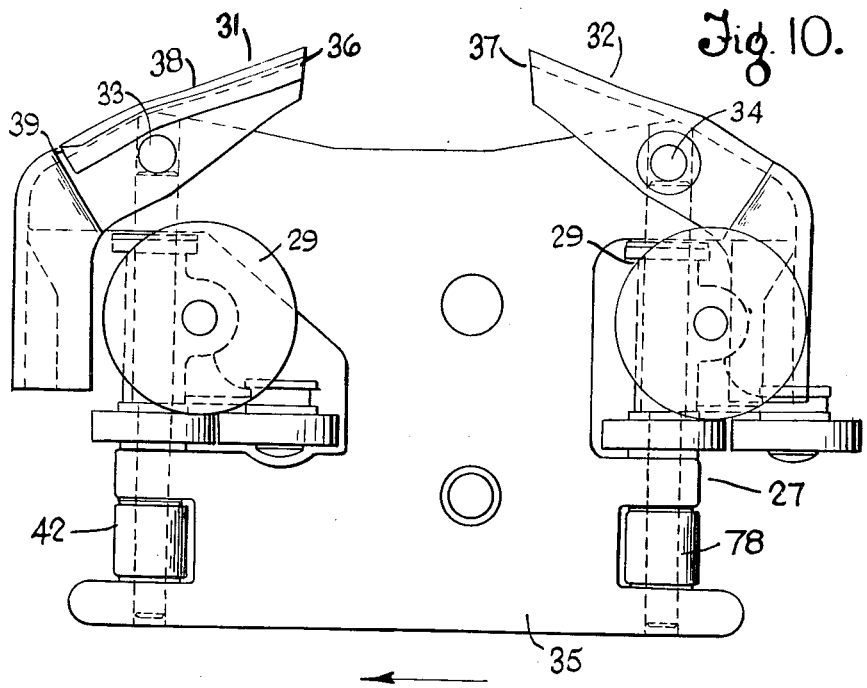

FIGURE 10 is a side elevation of one of the carriers employed in the conveyor system shown in the preceding figures.

Figure 11:
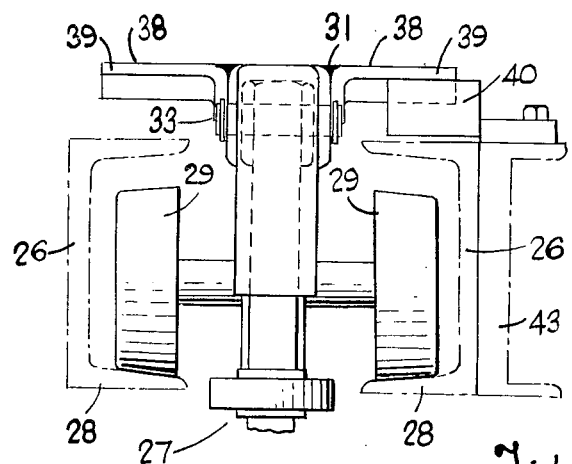

FIGURE 11 is a detailed view showing the operation of disengaging the drive between the conveying element and one of the carriers depicted in FIGURE 10.

Referring to the drawings, and more particularly to FIGURES 1, 3, 7, and 10, the conveyor system which is diagrammatically illustrated in FIGURE 1 comprises an endless conveying element in the form of an endless chain 15 and adapted to be power driven in the known manner through chain driving wheel 14 of conventional form and indicated diagrammatically in FIGURE 1.

The chain 15 is of known construction, being built up from forged link members 16 connected pivotally together by pairs of link plates 17, some of the link members 16 being mounted on the lower ends of the runners 18, the upper ends of which are forked in the known manner, each of the two arms 19 of which carry a roller 20, each roller running on one of the two flanges 21 of a chain track formed by a rail 22 of I section. Such chain 15 and its associated track is conventional and well known in the art.

The rail 22 is provided at intervals along its length with dependent straddle brackets 23 of inverted U form, between the lower ends of the arms 24 of which is secured a carrier track 25. Such track is formed from a pair of rectangular channels 26 which are each secured to one of the two arms 24, with their open sides directed towards one another, with the upper and lower flanges of each channel horizontal. The channels are spaced transversely apart to provide a space therebetween for the passage of the work supporting carriers, which are each constructed as wheeled trolleys 27 (see FIGURE 10), which trolleys are the subject of the aforementioned co-pending patent application of even date, in the specification of which they are more particularly described.

The two horizontally opposed lower flanges 28 of the channels forming the track 25 serve to support the load supporting wheels 29 of the trolleys.

The trolleys are adapted to be advanced along the track 25 by means of driving dogs 30 provided at intervals along the length of the chain 15, each of these dogs being carried upon a dog supporting plate 30a which replaces the lower of the two link plates 17 in each pair of link plates at the places where the dogs are provided.

As described more particularly in the co-pending specification, each trolley 27 is provided at its upper side with a pair of dog engaging shoes 31, 32, each of which is mounted for pivotal movement at 33, 34, respectively about a transverse horizontal axis in relation to the adjacent part of the trolley body 35, with the two shoes spaced relatively apart in the direction of trolley advancement as denoted by the arrows in the various figures, namely from right to left in FIGURE 10.

The trolley shoe 31 constitutes a driving shoe, the rearwardly directed face 36 of which forms an abutment for engaging with the driving dog 30, whereby the drive is transmitted from the chain to the trolley to advance the same along.

Herein the expressions "rearwardly" and "forwardly" have reference to the aforementioned designed direction of trolley advancement.

The shoe 32 constitutes a retarding shoe which serves to prevent the trolley overrunning the chain 15 insofar as the forwardly directed edge 37 of this shoe is adapted to engage with a rearwardly directed face of the chain dog 30.

The trolley shoes 31, 32, are gravitationally loaded so as normally to swing about their respective pivots into the dog engaging position depicted in FIGURE 10, but the two shoes 31, 32, are adapted respectively to pivot in a clockwise and anti-clockwise direction respectively as viewed in FIGURE 10 out of a dog engaging position so as, as more particularly described hereinafter in relation to the driving shoe 31, to provide for disconnection of the drive between the chain 15 and each trolley 27. For this purpose each driving shoe 31 is formed in its upper part above its pivot 33 with laterally oppositely directed flanges 38, which flanges terminate, as best shown in FIGURE 11, at a forwardly and laterally extending edge 39 which is located at the forward side of the associated shoe pivot 33, one of which edges 39 is adapted when engaged adjacent the underside of such edge to swing the shoe 31 in a clockwise direction (as viewed in FIGURES 3 to 5 and 10) to disengage the drive from the associated chain dog 30 for the purpose of arresting the trolley at any one of a number of work stations spaced apart along the length of the carrier or trolley track 25.

Referring now more particularly to FIGURES 1 and 2 of the drawings, the conveyor system there depicted is provided with a number of work stations, at each of which any one of the several work carrying trolleys 27 which would be provided are adapted to be arrested. For clarity and simplicity in description three such work stations are illustrated diagrammatically, namely WS1, WS2, and WS3, spaced along the length of one portion of the trolley track 25, the rearmost of the three illustrated stations being WS1 and the foremost WS3.

Each of these stations, one of which is depicted in FIGURES 3 to 5 and also FIGURES 8 and 9, comprises trolley arresting means consisting of a trolley drive disengaging member 40 and a positive stop member 41. The trolley drive disengaging member 40 is adapted when in its arresting position to engage with the underside of the trolley driving shoe flange edge 39 so as to pivot the driving shoe 31 out of engagement with an adjacent chain driving dog 30, and the stop member 41 when displaced into its arresting position is adapted to engage at a position below the underside of the trolley track 25 with an abutment roller 42 provided on the forward end of the trolley for rotation about a vertical axis relative to the trolley so as, immediately after the drive to the trolley has been disengaged, to engage with this roller and positively to prevent the further advancement of the trolley and hold it arrested against forward movement at the work station.

The drive disengaging member 40 is mounted on the forward portion adjacent the upper horizontal edge thereof of a swinging bracket 43 in the form of a plate of rectangular configuration, having a pair of vertically spaced rearwardly directed arms 44, which, adjacent the rear vertical edge of the plate, support it for pivotal movement about a vertical axis from a trunnion bearing 45 carried from the adjacent channel member 26 of the trolley track.

The bracket plate 43 depends below the adjacent track channel 26, its dependant portion 46 being of substantially channel section with the mouth of the channel directed horizontally towards the underside of the track 25 and housing the trolley stop member 41, which stop member is mounted for limited sliding movement in a direction longitudinally of the track between the two sides of the channel shaped portion 46, its movement being controlled by a leaf spring 47. The arrangement permits of the stop member 41 being displaced forwardly against the pressure of spring 47 relative to the swinging bracket 43 to permit of a trolley continuing to advance if, through some failure of the mechanism, it is still positively driven from one of the chain dogs 30, so as thereby to avoid damage to the parts of the conveyor system. The spring 47 is, however, of sufficient strength as to ensure the stoppage by the member 41 of an advancing trolley, the drive to which has previously been disconnected.

As appears from FIGURE 9, the stop member 41 is formed with a nose portion 48 which projects into the path of the trolley abutment roller 42 when the swinging bracket 43 is in its operative or arresting position depicted in FIGURES 8 and 9, and in this position the trolley drive disengaging member 40 projects into the path of the driving shoe flange 38 at the adjacent side of the trolley 27 so that, as shown in FIGURE 11, the upper forwardly and upwardly inclined shoe engaging face 49 of this member 40 which is depicted in outline in FIGURE 8 is then adapted to engage with the aforementioned trolley flange edge 39, and as the trolley continues to advance under the pressure of the dog 30, the shoe 31 will be progressively swung in a clockwise direction (viewed in FIGURE 10) about its pivot 33 to disengage its face 36 from dog 30 and disconnect the drive to the trolley before the abutment roller 42 on the trolley has engaged with the stop member nose 48.

Each of these stop members 41 are depicted diagrammatically in FIGURES 1 and 2 but for clarity the drive disengaging member 40 is not shown in these figures.

Each swinging bracket 43 is biased in a direction away from the adjacent trolley track 25 by a compression spring 50 acting between the swinging bracket 43 and an attachment plate 51 by which the parts associated with the swinging bracket are secured at the desired position to the adjacent side of the trolley track 25, the arrangement being such that when each swinging bracket 43 is under the pressure of spring 50 swung away from the track from the arresting position depicted in FIGURE 9 into an inoperative position corresponding to the position depicted in FIGURE 4, the previously arrested trolley is free to advance or a trolley passing a work station with the swinging bracket in such position will not be arrested.

For controlling the operation of the trolley arresting means provided at each of the work stations, namely WS1, WS2, and WS3 in FIGURES 1 and 2, there is provided a series of carrier operated control means, generally designated 1C, 2C, and 3C, each located in advance, i.e. forwardly of one of the work stations WS1, WS2, and WS3 respectively.

Each control means 1C, 2C, and 3C comprises, as best shown in FIGURES 6 and 7, a carrier or trolley arresting control member 1Ca, 2Ca, and 3Ca, and a trolley or carrier release control member 1Cb, 2Cb, and 3Cb.

As shown in FIGURES 6 and 7, these members 1Ca and 1Cb of control means 1C, and similarly the two members of each of the other control means 2C and 3C are each constructed as two armed levers mounted for pivotal movement about a vertical axis upon a common pivot 52 secured to the adjacent part of one of the trolley track channels 26 but for clarity in the diagrammatic views FIGURES 1 and 2 the members 1Ca, 1Cb, 2Ca, 2Cb, and 3Ca and 3Cb are depicted as being mounted for pivotal movement about horizontally spaced vertical axes.

Each carrier arresting control member Ca is operatively connected to the carrier arresting means of the next in rear work station. Thus member 1Ca of control means 1C is connected to the arresting means of work station WS1 and member 2Ca of control means 2C is connected to the arresting means of work station WS2.

Each carrier release control member Cb is connected to the carrier arresting means of the work station next but one in rear of the control means with which such member Cb is associated.

Thus carrier release control member 3Cb associated with control means 3C is connected to the arresting means of work station WS2 and control member 2Cb of control means 2C is connected to the arresting means of work station WS1.

Each carrier arresting control member Ca operatively connected to the work station next in rear is adapted to be engaged by a trolley advancing forwardly beyond such work station so as when so engaged to displace the arresting means of such work station into the trolley arresting position. Each carrier release control member Cb when engaged by a trolley advancing from the work station next in rear of such member Cb is adapted when engaged by such advancing trolley to be displaced and thereby effect displacement into the inoperative position of the arresting means of the work station next but one in rear to permit of the advancement of the second of two successive trolleys, the first of which has just engaged such carrier release control member.

Insofar as each of these carrier arresting control members and carrier release control members are constructed as levers, it will be convenient to describe them herein as station closing levers and station opening levers.

The connection of each lever to the arresting means of their respective work stations will now be described.

As best shown in FIGURE 7, each station closing lever Ca at a position intermediate the ends of the two arms 53, 54, of the lever is pivoted through pivot pin 55 to the forward end of swinging bracket rod 56, the rear end of which rod (see FIGURES 8 and 9) is slidable through bush 57 pivotally connected through pin 58 to a laterally outwardly projecting portion 59 of swinging bracket 43.

The rear end of the rod 56 is threaded and carries a nut 60, between which and the bush 57 is disposed a coiled compression spring 61. The arrangement is such that when the rod 56 is displaced in a forward direction consequent on the forward displacement of arm 53 of station closing lever Ca, the bracket 43 is swung in a clockwise direction as viewed in FIGURE 9 so as to displace the drive disengaging member 40 and stop member 41 into their arresting position.

The arm 54 of each station closing lever Ca is pivoted adjacent the free end of the arm at 62 to the rear end of intermediate rod 63, the front end of which rod is pivoted at 64 to the station opening lever Cb of the next in advance control means.

Thus station closing lever 1Ca is connected by rod 63 to station opening lever 2Cb and station closing lever 2Ca is similarly connected to station opening lever 3Cb in the manner diagrammatically shown in FIGURES 1 and 2.

Each of the station opening levers Cb are in fact one armed levers, the pivot 64 between the forward end of each intermediate rod 63 and the pivotal support 52 being intermediate such pivotal support and the operation or trolley engaging end 65 of such lever.

Each of the two levers Ca, Cb, have their respective trolley engaging ends, namely, 66, 65 (see FIGURE 7), directed rearwardly in relation to the common lever pivot 52 when the levers are in a position to be engaged by an advancing trolley.

Thus each of of the two levers Ca, Cb are adapted to be swung in an anti-clockwise direction as viewed in plan about their associated pivot when engaged by an advancing trolley, with the abutment roller 42 of which each lever and 65, 66 is adapted to engage so as to permit of each trolley advancing freely past the said levers.

The arrangement is such that each station closing lever Ca is swung in an anti-clockwise direction as it moves from its rearwardly directed inoperative or open position into its forwardly directed operative or station closing position and the station opening lever Cb is displaced in a forward direction, i.e. swung in an anti-clockwise direction as viewed in plan in moving from the station closed to the station opening position.

In order effectively to retain the station closing lever Ca in its station closing position and prevent the lever inadvertently moving under the pressure of swinging bracket spring 50 into the station opening position, the pivot 55 between each lever Ca and the swinging bracket rod 56 is arranged to move into or slightly over a dead centre position in relation to the lever pivot 52 as the lever Ca moves into its station closed position. The foregoing will be apparent from FIGURE 7, which in dotted outline shows an intermediate position for the lever Ca and its associated swinging bracket rod pivot 55 as this moves towards the station closed position. In this latter position any thrust in rod 56 in either direction will be ineffective in swinging the lever Ca out of its station closed position.

The sequence of operation of the parts as so far explained will now be described with reference to FIGURES 1 to 5 of the drawings. FIGURES 1 and 3 show a trolley designated 27i in FIGURE 1, arrested at work station WS1 by the operation of the associated arresting means, including stop member 41 of WS1 shown in the arresting position. Two further trolleys 27ii and 27iii are also depicted in FIGURE 1, of which the trolley 27ii is at works station WS2 and trolley 27iii has advanced beyond the work station WS3.

Such trolley 27iii is depicted as having advanced as far as the station opening and closing levers of control means 3C and is depicted diagrammatically as having just engaged with each of these two levers so as to displace the station closing lever 3Ca into its station closing position, thereby permitting of the arresting means, including stop member 41 of work station WS3, moving into its arresting position as depicted in FIGURE 1, ready to arrest at WS3 the next following trolley 27ii.

At the same time the foremost of the three trolleys namely 27iii has also engaged the station opening lever of control means 3C, namely lever 3Cb so as to displace this in a forward direction about its pivot 52 (see FIGURE 7), thereby displacing in a forward direction its associated intermediate rod 63, the rear end of which is connected at 62 to closing lever 2Ca of control means 2C. This lever 2Ca is accordingly displaced in a clockwise direction as viewed in plan about its pivot 52, causing its pivot to swinging bracket rod 56 to move out of the dead centre position in relation to the lever supporting pivot 52 so that the lever 2Ca swings into the position depicted in FIGURE 1, thereby displacing the associated swinging bracket rod 56 in a rearward direction.

Referring to FIGURE 9, the rod 56, when displaced in a rearward direction is free to slide rearwardly relative to boss 56, thus permitting of the swinging bracket 43, with its associated stop member 41, and trolley drive disengaging member 40, swinging outwardly into an inoperative position away from track 25 under the pressure of spring 50 so that, as shown in FIGURE 1, the stop member 41, of WS2 is in the inoperative or open position permitting of trolley 27ii advancing in the manner depicted in FIGURE 4 of the drawings under the control of one of the chain driving dogs 30.

Referring now to FIGURE 2, the trolley 27ii has now advanced beyond work station WS2 and has just engaged station closing lever 2Ca of control means 2C and has also just engaged the adjacent station opening lever 2Cb so as to displace both of these levers in a forward direction from the position depicted in FIGURE 1. Thus, by the displacement of station closing lever 2Ca, the arresting means, including the positive stop 41 of the work station WS2 next in rear, has been returned to its arresting position and at the same time, by means of the intermediate rod connection 63 between lever 2Ca and station opening lever 3Cb of the control means 3C next in advance, lever 3Cb has been swung rearwardly back to its trolley engaging position ready to be engaged by the next advancing trolley for the purpose of opening station WS2.

The above mentioned engagement of trolley 27ii with station opening lever 2Cb swings into a trolley engaging position station closing lever 1Ca, of the work station next but one in rear, namely WS1, and by the connection from this lever through rod 56 to the arresting means, including stop member 41, of work station WS1, permits of the member 41 moving into an inoperative position so as now to permit of advancement of the trolley 27i previously arrested at this station.

Accordingly, such trolley now commences to advance in the manner also depicted in FIGURE 4 until it engages with the two levers 1Ca and 1Cb so as to displace these from the rearward trolley engaging position depicted in FIGURE 4 in a forward direction as above described and in the manner illustrated in FIGURE 5.

As a preferred optional addition to the conveyor system as so far described, means, which form no part of the present invention, are provided for preventing each swinging bracket 43 with its associated drive disengaging member 40 and stop member 41 moving into the inoperative position to release a trolley when permitted so to do until this is under the control of the next advancing chain dog 30, even though movement of such swinging bracket 43 into the inoperative position may have been permitted by the forward displacement of the associated station opening lever Cb, displacing rod 56 rearwardly relative to its connection to the swinging bracket 43 through boss 57 and pivot 58. Such means consists of the provision (see FIGURES 8 and 9) of latch member 67 mounted at its rear end for pivotal movement about a horizontal transverse axis at pivot 68 carried on the upper end of post 69 secured to the adjacent part of track 25. The forward end 70 of this latch member is adapted to engage with the rearwardly directed edge 71 of follower plate 72 connected to the swinging bracket 43 so as when the swinging bracket is in the arresting position illustrated in FIGURES 8 and 9 thereby positively to retain the bracket with the associated members 40 and 41 in their arresting position except when the latch member 67 is raised to bring its forward end 70 clear of the follower plate 72 under the action of a chain dog advancing ready to engage with a previously arrested trolley.

For this purpose the latch member 67 is provided with a downwardly forwardly inclined cam portion 73, the underside of which is adapted to engage with a laterally projecting lug 74 on the chain dog 30 so as thereby momentarily to raise the latch as the dog advances into a trolley engaging position and permit of the bracket 43, with the members 40 and 41, swinging outwardly clear of the trolley under the pressure of spring 50, into the position shown in FIGURE 4.

Such an arrangement avoids any possibility of a trolley advancing not under the control of a dog 30 by premature movement of the swinging bracket 43 into its free position following the displacement of a station opening lever Cb by engagement with the advancing trolley next ahead of the arrested trolley.

As a further non-essential feature of the invention there is provided (see FIGURES 8 and 9) a spring loaded back stop 75, wich serves to prevent the return movement of a trolley arrested at each of the several work stations, such back stop provided at each work station being construted as a plate mounted for pivotal movement about a vertical axis on pin 76 provided on the lower end of post 69, the plate having an outwardly rearwardly inclined face 77 adapted to engage with the roller 42 at the front end of the advancing trolley so as thereby to cause the plate to swing outwardly away from the track and permit of the advancement of the trolley past the plate until the roller 78 (see FIGURE 10) at the rear end of the trolley moves clear of the rearwardly inclined face 77 of the back stop plate, which now swings towards the trolley track under the pressure of spring 79, bringing the forwardly directed face 80 of this back stop plate into a position for engaging with the aforementioned trolley roller 78 to thereby prevent the trolley from moving in the direction opposite to its direction of advancement.

What I claim then is:

1. A conveyor system of the kind specified characterised by the provision of a carrier track, a plurality of work stations spaced apart along the length of the carrier track, carrier arresting means at each of said work stations displaceable between carrier arresting and carrier advancing positions, a carrier operated control means located in advance of each of said work stations and adapted to be actuated by the passage of a carrier along the track, each of said control means comprising a carrier arresting control member and a carrier release control member operatively connected respectively to the carrier arresting means of the next in-rear and next but one in rear work station, the arrangement being such that advance of a carrier along the track to one of said control means to a station operates one of the said carrier arresting control members thereof to effect displacement of the associated arresting means at the work station next in rear of said control means from a carrier advancing to a carrier arresting position to preclude the advancement of a further carrier beyond said next in-rear work station, and also operates the carrier release control member of said control means to effect displacement of the associated carrier arresting means of the work station next but one in-rear of said control means from the carrier arresting to the carrier advancing position so as thereby to permit of the advance of a further carrier from said next but one in-rear work station to said next in-rear control means.

2. A conveyor system according to claim 1 wherein the means connecting each carrier release control member of a control means to the arresting means of the work station next but one in-rear of said control means also connects to said arresting means the carrier arresting control member of said next but one in-rear work station.

3. A conveyor system comprising:
   (a) a track,
   (b) a plurality of article carriers advanceable along said track,
   (c) an endless conveyor element adapted to advance said article carriers along said track,
   (d) a plurality of carrier arresting means disposed in spaced apart relationship along the length of said track and displaceable relative to the track between a carrier arresting position and a carrier release position,
   (e) a plurality of carrier control means each located in advance of one of said carrier arresting means,
   (f) each control means embodying a carrier arresting control member and a carrier release control member,
   (g) means connecting the arresting control member of each control means to the carrier arresting means next in-rear of such control means,
   (h) means connecting the carrier release control member of each control means to the arresting means next but one in-rear of such control means,
   (i) each control member being displaceable relative to the track between an inoperative position and a position for engagement by an advancing carrier,
   (j) each carrier arresting control member when engaged by an advancing carrier being adapted to be thereby displaced to displace the arresting means next in-rear into a carrier arresting position and
   (k) each carrier release control member when engaged by an advancing carrier being adapted to be thereby displaced to displace the arresting means of the next but one-in-rear into a release position.

4. A conveyor system according to claim 3 wherein the two control members of each control means are located at the same common position along the length of the track.

5. A conveyor system according to claim 3 wherein each conrol member is constructed as a pivotally mounted lever, one portion of which is adapted to engage with a part of an advancing carrier so as thereby to be displaced about its supporting pivot.

6. A conveyor system according to claim 3 wherein each carrier arresting control member is constructed as a lever mounted for pivotal movement between two extreme positions at one of which positions wherein the associated carrier arresting means is in its carrier release position, a striking part on the lever projects into the path of an advancing carrier to thereby swing the lever about its pivot into a position in which the striking part is disposed at one side of the path of the advancing carrier and the associated arresting means is in its arresting position, the said carrier arresting control member lever having a linkage connection to the associated carrier arresting means and the arrangement being such that as the lever is swung about its pivot by an advancing carrier the point of connection between the lever and the linkage passes into a dead centre position in relation to the pivotal support for the lever so as thereby to retain the same in a position in which the associated arresting means is in its carrier arresting position.

7. A conveyor system according to claim 6 wherein the linkage connection embodies a spring means adapted to permit a relative movement occurring between the lever and the associated arresting means as the lever moves into the dead centre position.

8. A conveyor system comprising:
   (a) a track,
   (b) a plurality of article carriers advanceable along said track,
   (c) an endless conveyor element adapted to advance said article carriers along said track,
   (l) a plurality of carrier arresting means spaced relatively apart along the length of said track,
   (m) means mounting each arresting means for pivotal movement relative to said track between a carrier release position and a carrier arresting position in which the arresting means is adapted to arrest a carrier advancing to the same,
   (e) a plurality of carrier control means each located in advance of one of said carrier arresting means,
   (n) each carrier control means comprising a carrier arresting lever and a carrier release lever,
   (o) means mounting each of said two levers for pivotal movement relative to said track between an inoperative position and an operative position in which a striking part on each lever projects into the path of an advancing carrier to thereby displace said lever from its operative to its inoperative position,
   (p) linkage means connecting the arresting control lever of each control means to the arresting means next in-rear thereof and also connecting the release control lever of each control means to the arresting means next but one in-rear thereof, (q) each arresting control lever with its associated linkage means being adapted on engagement of said arresting control lever by an advancing carrier to effect displacement of the next in-rear arresting means into the arresting position, (r) and each release control lever with its associated linkage means being adapted when engaged by an advancing carrier to displace the next but one in-rear arresting means into the release position.

9. A conveyor system comprising:
(a) a track,
(b) a plurality of article carriers advanceable along said track,
(c) an endless conveyor element adapted to advance said article carriers along said track,
(l) a plurality of carrier arresting means spaced relatively apart along the length of said track,
(m) means mounting each arresting means for pivotal movement relative to said track between a carrier release position and a carrier arresting position in which the arresting means is adapted to arrest a carrier advancing to the same,
(e) a plurality of carrier control means each located in advance of one of said carrier arresting means,
(n) each carrier control means comprising a carrier arresting lever and a carrier release lever,
(o) means mounting each of said two levers for pivotal movement relative to said track between an inoperative position and an operative position in which a striking part on each lever projects into the path of an advancing carrier to thereby displace said lever from its operative to its inoperative position,
(s) means connecting the arresting control lever of each control means to the arresting means next in-rear thereof,
(t) lever connecting linkage joining each arresting control lever to the release control lever of the next in advance control means serving to maintain one or the other of said two connected levers in operative position with the other two connected levers simultaneously in inoperative position,
(u) each arresting control lever being adapted on engagement by an advancing carrier to effect displacement of the next in-rear arresting means into the arresting position and simultaneously to displace through the connecting linkage the next in advance release control member from an inoperative to an operative position,
(v) and each release control lever being adapted when engaged by an advancing carrier to displace the arresting control lever connected thereto together with its associated arresting means into inoperative and release positions respectively.

10. A conveyor system according to claim 9 wherein each carrier arresting control lever is constructed as a a two armed lever, the arms of which are of different length, the longer arm of which is provided at its extremity with a striking part and the shorter arm of which is connected pivotally to one end of a link in the form of a pull rod, the other end of which pull rod has a spring loaded lost motion connection to an arm forming with the rod, a linkage connection to the carrier arresting means respectively next in-rear of said arresting control lever.

11. A conveyor system according to claim 10 wherein the lost motion connection is provided by mounting the end of the pull rod remote from said two armed lever for slidable movement within a bush provided on the arm which is connected to the carrier drive disengaging means, the pull rod having an abutment on its free end between which and the adjacent part of the said bush works a compression spring, which serves to transmit pull from the rod to the associated carrier arresting means.

12. A conveyor system according to claim 9 wherein each carrier arresting control lever is pivoted to one end of a link, the opposite end of which is connected to the carrier arresting means next in-rear, the pivot between each arresting lever and the said link being adapted to move over a dead centre position in relation to the mounting pivot for the arresting control lever when the latter is engaged by an advancing carrier to retain said control lever in the position into which it is displaced by the advancing carrier with the associated arresting means in its arresting position until such arresting control lever is returned into its operative position by engagement of an advancing carrier with the release control lever connected to such arresting control lever.

13. A conveyor system according to claim 8 wherein the two levers of each control means are mounted upon a common pivot for pivotal movement about a common vertical axis.

14. A conveyor system according to claim 3 wherein each of the carriers are provided with a drive transmitting member mounted thereon and movable relative to the carrier between a drive transmitting and a drive disengaged position in which the drive transmitting member is respectively in engagement with or disengaged from the endless conveyor element.

No references cited.